US008287381B2

(12) United States Patent
Gagner et al.

(10) Patent No.: US 8,287,381 B2
(45) Date of Patent: Oct. 16, 2012

(54) CONTENT DEPENDENCY VERIFICATION FOR A GAMING MACHINE

(75) Inventors: Mark B. Gagner, West Chicago, IL (US); Nevin J. Liber, Libertyville, IL (US); Craig J. Sylla, Round Lake, IL (US); Matthew J. Ward, Northbrook, IL (US); Jason A. Smith, Vernon Hills, IL (US); Jacob C. Greenberg, Elgin, IL (US)

(73) Assignee: WMS Gaming Inc., Waukegan, IL (US)

( * ) Notice: Subject to any disclaimer, the term of this patent is extended or adjusted under 35 U.S.C. 154(b) by 1134 days.

(21) Appl. No.: 11/995,764

(22) PCT Filed: Jul. 18, 2006

(86) PCT No.: PCT/US2006/027935

§ 371 (c)(1),
(2), (4) Date: Jan. 15, 2008

(87) PCT Pub. No.: WO2007/011971

PCT Pub. Date: Jan. 25, 2007

(65) Prior Publication Data

US 2008/0200256 A1 Aug. 21, 2008

Related U.S. Application Data

(60) Provisional application No. 60/700,153, filed on Jul. 18, 2005.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl. ........................................ 463/42

(58) Field of Classification Search .................... 463/42
See application file for complete search history.

(56) References Cited

U.S. PATENT DOCUMENTS

| | | | | |
|---|---|---|---|---|
| 6,645,077 | B2 * | 11/2003 | Rowe | 463/42 |
| 6,884,173 | B2 | 4/2005 | Gauselmann | |
| 7,337,330 | B2 * | 2/2008 | Gatto et al. | 713/191 |
| 7,415,706 | B1 * | 8/2008 | Raju et al. | 717/170 |
| 2003/0228912 | A1 * | 12/2003 | Wells et al. | 463/43 |
| 2004/0059703 | A1 * | 3/2004 | Chappell et al. | 707/1 |
| 2004/0180721 | A1 * | 9/2004 | Rowe | 463/42 |
| 2004/0254013 | A1 | 12/2004 | Quraishi et al. | |
| 2004/0259633 | A1 * | 12/2004 | Gentles et al. | 463/29 |
| 2009/0124372 | A1 * | 5/2009 | Gagner et al. | 463/29 |

OTHER PUBLICATIONS

"International Search Report for Application No. PCT/US2006/27935, date mailed Feb. 23, 2007", 4 pgs.
"Written Opinion of the International Searching Authority for Application No. PCT/US2006/27935, date mailed Feb. 23, 2007", 7 pgs.

* cited by examiner

*Primary Examiner* — David L Lewis
*Assistant Examiner* — Reginald Renwick
(74) *Attorney, Agent, or Firm* — Schwegman Lundberg & Woessner, P.A.

(57) ABSTRACT

A system, apparatus and method for dependency verification of content distributed to a gaming machine is described herein. In some embodiments, a method includes receiving, over a network and into a gaming machine, data that includes a software component. The method also includes verifying that the gaming machine includes the version or the range of versions of a component, upon determining that the software component is dependent on a version or a range of versions of the component that is part of the gaming machine.

18 Claims, 11 Drawing Sheets

400

| 402 SOFTWARE ID | 404 VERSION | 406 SCHEDULE |
|---|---|---|
| SOFTWARE COMPONENT A | X.X | 05/05/2001 |
| ⋮ | ⋮ | ⋮ |
| SOFTWARE COMPONENT N | Y.Y | 12/15/2002 |

FIG. 4

CONTENT DEPENDENCY VERIFICATION FOR A GAMING MACHINE

RELATED APPLICATIONS

This application is a U.S. National Stage Filing under 35 U.S.C. 371 from International Patent Application Serial No. PCT/US2006/027935, filed Jul. 18, 2006, and published on Jan. 25, 2007 as WO 2007/011971 A2 and republished as WO 2007/011971 A3, which claims the priority benefit of U.S. Provisional Application Ser. No. 60/700,153 filed Jul. 18, 2005, the content of which is incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

BACKGROUND

1. Field

This invention relates generally to the field of network communications and more particularly to the field of communications over a network with a gaming machine.

2. Description of Related Art

Wagering game makers continually provide new and entertaining games. One way of increasing entertainment value associated with casino-style wagering games (e.g., video slots, video poker, video black jack, and the like) includes offering a base game and a variety of bonus events. However, despite the variety of bonus events, players often lose interest in repetitive gaming content. In order to maintain player interest, wagering game machine makers frequently update game themes, game settings, bonus events, and other gaming content.

In order to satisfy player demands, gaming machine operators continuously license and deploy new gaming content to gaming machines operating in the field. Gaming machine operators typically update gaming content by manually delivering updated gaming content to each gaming machine. For example, when a gaming machine's gaming content becomes undesirable or a license expires, an operator typically replaces existing media (e.g. ROM, CD-ROM, or flash RAM) with new media containing updated gaming and licensing content. For gaming machine operators owning scores of machines, this process can be laborious and expensive.

SUMMARY

A system, apparatus and method for dependency verification of content distributed to a gaming machine is described herein. In some embodiments, a method includes receiving, over a network and into a gaming machine, data that includes a software component. The method also includes verifying that the gaming machine includes the version or the range of versions of a component, upon determining that the software component is dependent on a version or a range of versions of the component that is part of the gaming machine.

In some embodiments, a method includes receiving a data package that includes a software component and a list of one or more dependencies on which the software component is dependent. The method also includes authenticating the data package. The method includes verifying that the gaming machine includes the one or more dependencies.

In some embodiments, an apparatus includes a machine-readable medium that includes a quarantined storage. The apparatus includes a download module to receive, over a network, a data package that includes a software component and a list of a version of one or more dependencies on which the software component is dependent. The download module is to store the data package in the quarantined storage. The apparatus also includes an authentication module to authenticate the data package. The apparatus includes a version manager module to verify that the apparatus includes the version of the one or more dependencies. The apparatus also includes an install module to install the software component on the apparatus, if the data package is authentic.

BRIEF DESCRIPTION OF THE FIGURES

The present invention is illustrated by way of example and not limitation in the Figures of the accompanying drawings in which:

FIG. 4 illustrates a data structure of installed software stored in the gaming machine, according to some embodiments of the invention.

DESCRIPTION OF THE EMBODIMENTS

Systems, apparatus and methods for dependency verification for distributed gaming content are described herein. This description of the embodiments is divided into five sections. The first section describes an example operating environment and system architecture. The third section describes example operations. The fourth section provides some general comments.

Hardware, Operating Environment and System Architecture

This section provides an example system architecture in which embodiments of the invention can be practiced. This section also describes an example computer system and gaming machine. Operations of the system components will be described in the next section.

Example System Architecture

Figure 1:
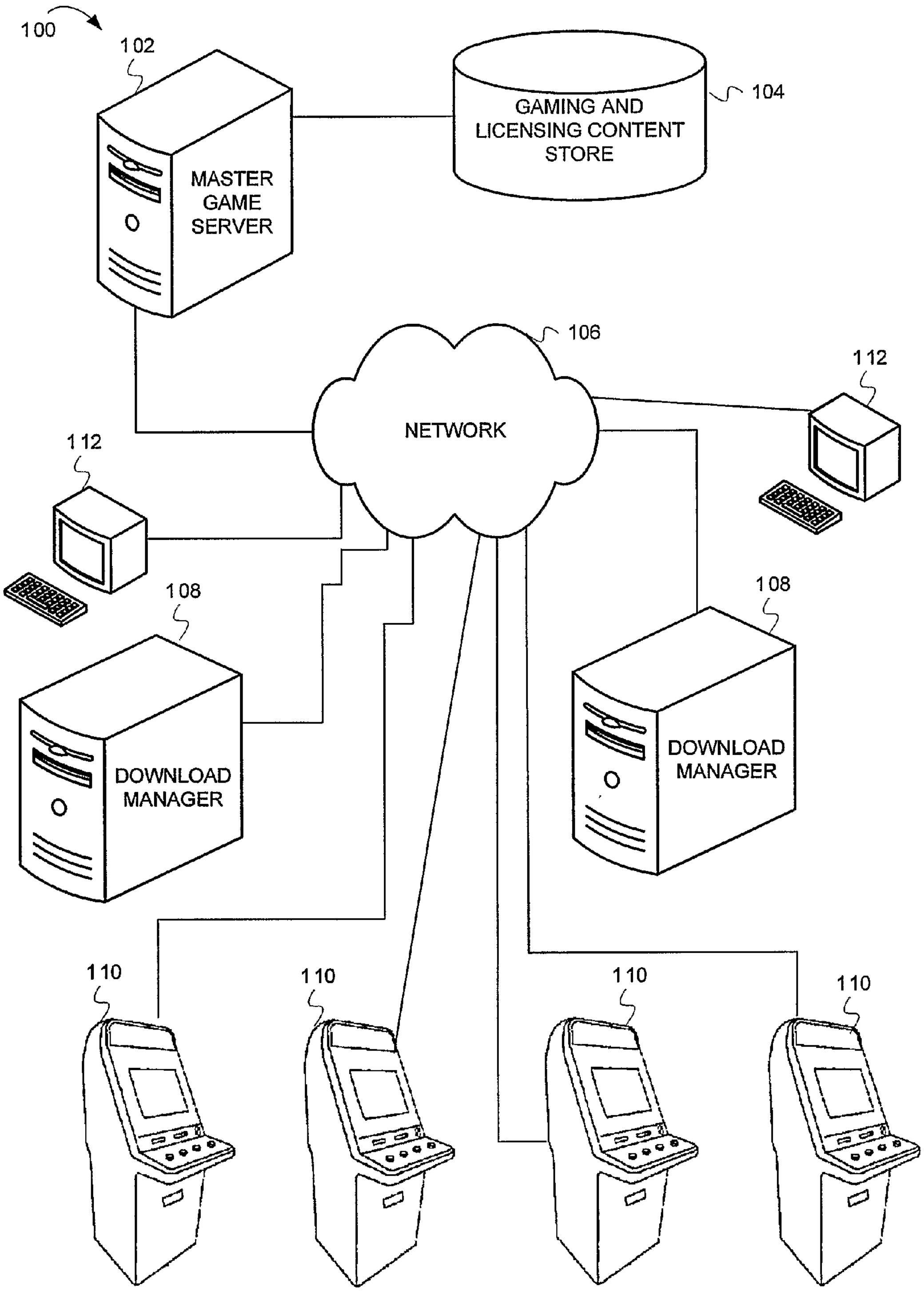
FIG. 1 is a block diagram illustrating a system for dependency verification for distributed gaming content, according to some embodiments of the invention.

FIG. 1 is a block diagram illustrating a system for dependency verification for distributed gaming content, according to some embodiments of the invention. As shown in FIG. 1, a system 100 includes a master game server 102 which is connected to gaming and licensing content store 104. The master game server 102 is also connected to a network 106, which is connected to a pair of download managers 108. Each download manager 108 is connected to an administrator terminal 112 and pair of gaming machines 110.

The gaming and licensing content store 104 includes gaming content and licensing content. The gaming content can include instructions and/or data used for conducting casino style wagering games (e.g., video slots, video poker, video black jack, and the like). In some embodiments, the gaming content may include program code, audio content, video content, and/or other data used for conducting all or part of a casino style slots game and/or bonus events.

The licensing content may include data and/or instructions for enforcing a license for using gaming content. In some embodiments, the licensing content may be used to enforce any suitable licensing model.

In some embodiments, the master game server 102 distributes gaming and licensing content to the download managers 108. The download managers 108 may manage delivery of the gaming and licensing content to the gaming machines 110. In some embodiments, the master game server 202 distributes gaming and licensing content using one or more data packages, as described in greater detail below (see System Operations section).

In some embodiments, each gaming machine 110 serves as a thin client to a download manager 108 or other computer system. As a thin client, each gaming machine 110 includes logic for presenting and receiving gaming information, while logic for conducting games is disposed within the download manager 108 or other computer system (not shown). In another embodiment, the gaming machine 110 includes all logic for presenting and receiving gaming information and for conducting a game. The gaming machines 110 may be embodied in any suitable computing device, such as a desktop computer, laptop computer, or personal digital assistant.

The components of the system 100 may be connected using any suitable connection technology. For example, the components can be connected via RS-232, Ethernet, 802.11, public switched telephone networks, DSL, or any other connection technology. The network 120 may be a local area network or wide-area network and can transmit licensing and gaming content using any suitable communication protocols. The administrator terminals 112 may be used for configuring and accessing licensing and gaming content stored in the download managers 108.

Figure 2:
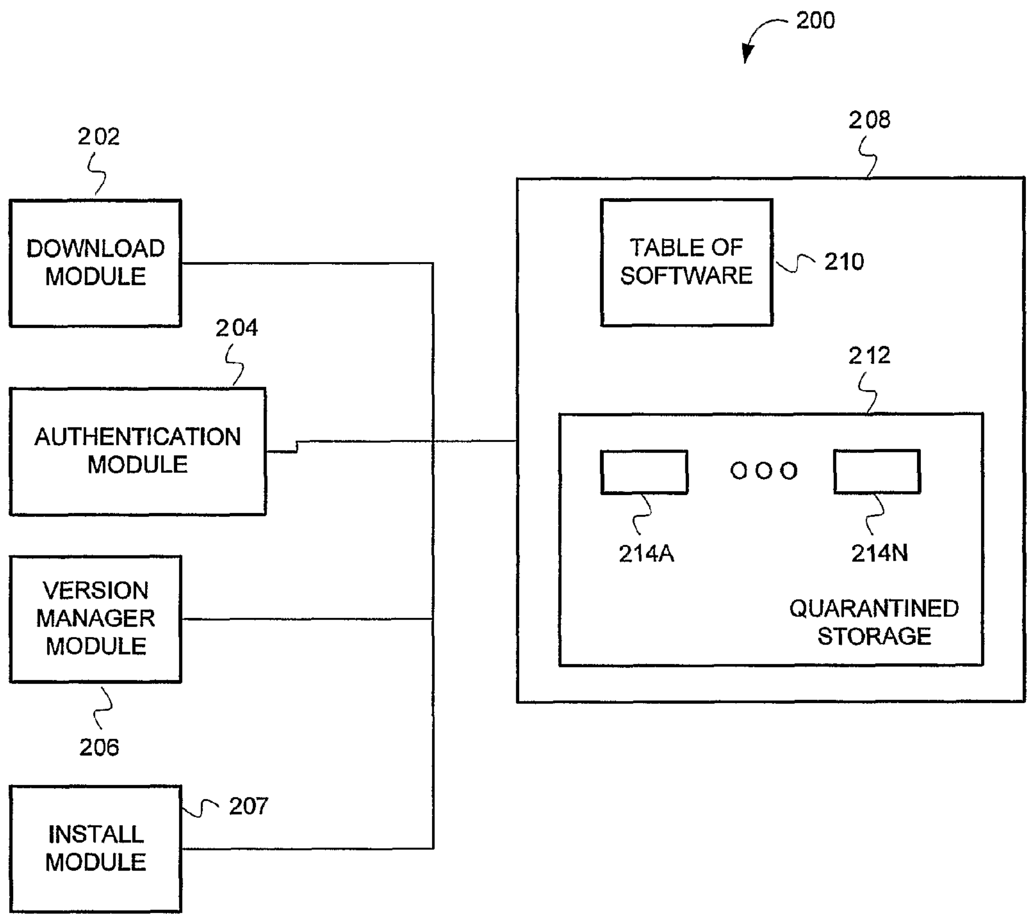
FIG. 2 illustrates a more detailed block diagram of parts of a computer system that includes dependency verification for distributed gaming content, according to some embodiments of the invention.
Figure 3:
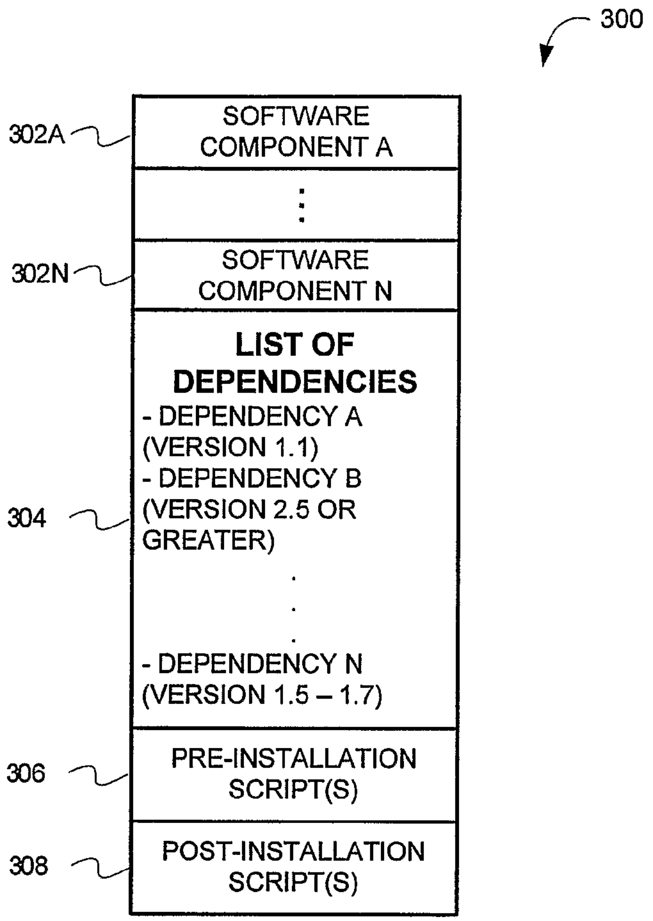
FIG. 3 illustrates a more detailed block diagram of a data package used for gaming content distribution, according to some embodiments of the invention.
Figure 5:
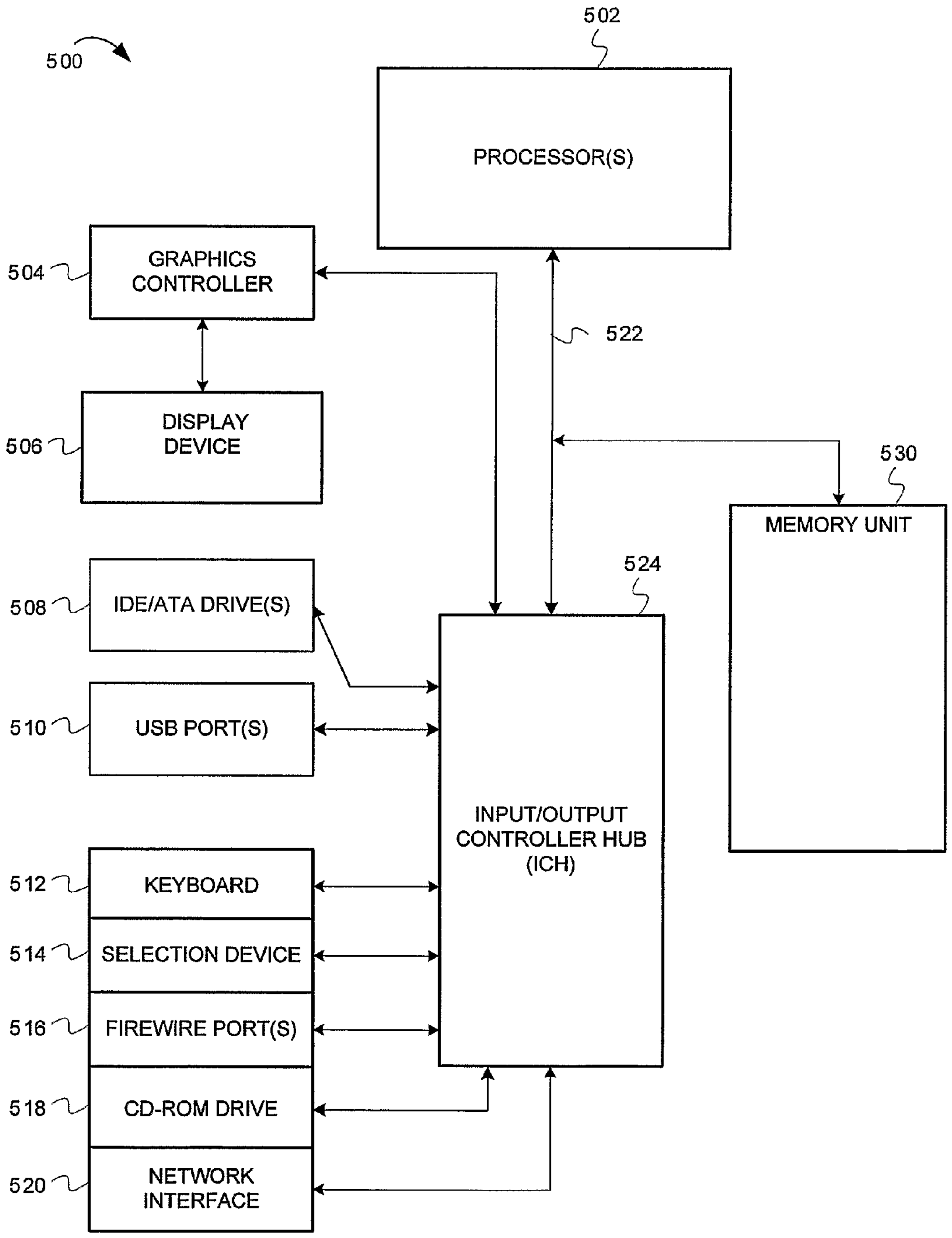
FIG. 5 illustrates a computer device that executes software for performing operations related to dependency verification, according to some embodiments of the invention.

While FIG. 1 describes a system for dependency verification for distributed gaming content, FIG. 2 illustrates parts of a gaming machine. FIG. 3 illustrates a data package that is transmitted between the master game server and the gaming machine. FIG. 4 illustrates a table that may be stored on the gaming machine and used as part of the dependency verification. FIG. 5 illustrates a computer that may be representative of a master game server or a gaming machine.

Example Wireless Environment

In some embodiments, at least part of the communications in the system 100 of FIG. 1 may be wireless. For example, communication between the master game server 102 and the gaming and licensing content store 104 may be wireless. Alternatively or in addition, communication between the master game server 102 and the network 106. Alternatively or in addition, communication between the network 106 and the gaming machine 110, the administrator terminals 112 or the download managers 108 may be wireless. While the following description is relative to communication between a wireless access point on the network 106 and a gaming machine 110, such description is applicable to any of the wireless communications in the system 100.

In some embodiments, a wireless access point in the network 106 and the gaming machines 110 can communicate orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access point and gaming machines 110 can communicate in accordance with a broadband multiple access technique, such as orthogonal frequency division multiple access (OFDMA). In some embodiments, the wireless access point and gaming machines 110 can communicate using spread-spectrum signals.

In some embodiments, the wireless access point can be part of a communication station, such as wireless local area network (WLAN) communication station including a Wireless Fidelity (WiFi) communication station, or a WLAN access point (AP). In these embodiments, the gaming machines 110 can be part of a mobile station, such as WLAN mobile station or a WiFi mobile station.

In some other embodiments, the wireless access point can be part of a broadband wireless access (BWA) network communication station, such as a Worldwide Interoperability for Microwave Access (WiMax) communication station, as the wireless access point can be part of almost any wireless communication device. In these embodiments, the gaming machines 110 can be part of a BWA network communication station, such as a WiMax communication station.

In some embodiments, any of the gaming machines 110 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the frequency spectrums for the communication signals transmitted and received by the wireless access point and the gaming machines 110 can comprise either a 5 gigahertz (GHz) frequency spectrum or a 2.4 GHz frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5

GHz, but other frequency spectrums are also equally suitable. In some BWA network embodiments, the frequency spectrum for the communication signals can comprise frequencies between 2 and 11 GHz.

In some embodiments, the wireless access point and the gaming machines 110 can communicate RF signals in accordance with specific communication standards, such as the Institute of Electrical and Electronics Engineers (IEEE) standards including IEEE 802.11(a), 802.11(1b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point and the gaming machines 110 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point and the gaming machines 110 can include one or more antennas (not shown). These antennas can comprise directional or omnidirectional antennas, including, for example, dipole antennas, monopole antennas, patch antennas, loop antennas, microstrip antennas or other types of antennas suitable for transmission of the RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to 1/10 of a wavelength or more.

In some embodiments, handoffs between different wireless access points and one of the gaming machines 110 can be performed based on a signal-to-noise ratio (SNR), a signal-to-noise and interference ratio (SNIR), a bit-error rate (BER), or an energy per received bit.

In some embodiments, the wireless access point and the gaming machines 110 can communicate in accordance with standards such as the Pan-European mobile system standard referred to as the Global System for Mobile Communications (GSM). In some embodiments, the wireless access point and the gaming machines 110 can also communicate in accordance with packet radio services such as the General Packet Radio Service (GPRS) packet data communication service. In some embodiments, the wireless access point and the gaming machines 110 can communicate in accordance with the Universal Mobile Telephone System (UMTS) for the next generation of GSM, which can, for example, implement communication techniques in accordance with 2.5 G and third generation (3G) wireless standards (See 3GPP Technical Specification, Version 3.2.0, March 2000). In some of these embodiments, the wireless access point and the gaming machines 110 can provide packet data services (PDS) utilizing packet data protocols (PDP). In other embodiments, the wireless access point and the gaming machines 110 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point and the gaming machines 110 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point and the gaming machines 110 can communicate in accordance with an ultra-wideband (UWB) communication technique where a carrier frequency is not used. In other embodiments, the wireless access point and the gaming machines 110 can communicate in accordance with an analog communication technique. In other embodiments, the wireless access point and the gaming machines 110 can communicate in accordance with an optical communication technique, such as the Infrared Data Association (IrDA) standard. In some embodiments, the wireless access point and the gaming machines 110 can communicate in accordance with the Home-RF standard which can be in accordance with a Home-RF Working Group (HRFWG) standard.

Example Computer System and Gaming Machine

FIG. 2 illustrates a more detailed block diagram of parts of a system that includes dependency verification for distributed gaming content, according to some embodiments of the invention. As illustrated in FIG. 2, a system 200 includes a download module 202, an authentication module 204, a version manager module 206, an install module 207 and a storage device 208, which are coupled together. The storage device 208 may be representative of any type of volatile and/or non-volatile storage. For example, the storage device 208 may be different types of hard disk drives, different types of memory (e.g., Static Random Access Memory (SRAM), Dynamic Random Access Memory (DRAM), etc.), etc.

The storage device 208 stores a table of software 210. The storage device 208 also includes a quarantined storage 212. The quarantined storage 212 includes data packages 214A-214N. The data packages 214A-214N are representative of the data packages received from the master game server 202. An exemplary embodiment of one of the data packages 214A-214N is illustrated in FIG. 3, which is described in more detail below. In some embodiments, the quarantined storage 212 may be a section of storage in the storage device 208 that has limited accessibility. For example, in some embodiments, only the download module 202, the authentication module 204, the version manager module 206 and the install module 207 may access this section of storage. In some embodiments, the quarantined storage 212 is configured such that no executables stored therein may be executed.

The table of software 210 may be any type of data structure including a list, table, object, data array, etc. The table of software 210 may include a list of the identifications of software installed and/or stored on the gaming machine 110. The table of software 210 may also include the versions of the software and date of installation/storage on the gaming machine 110. An exemplary embodiment of the table of software 210 is illustrated in FIG. 4, which is described in more detail below.

The download module 202, the authentication module 204 and the version manager module 206 may be representative of software, hardware, firmware or a combination thereof. For example, the download module 202, the authentication module 204, the version manager module 206 and the install module 207 may be software to be executed on a processor (not shown). The operations of the download module 202, the authentication module 204, the version manager module 206 and the install module 207 are described in more detail below (see System Operations section).

FIG. 3 illustrates a more detailed block diagram of a data package used for software component distribution, according to some embodiments of the invention. The data package 300 may be representative of the data transmitted from the master game server 102 to one of the gaming machines 110. The data package 300 may include any number of software components 302A-302N. The software components 302A-302N may be representative of a new game application that may be executed on the gaming machine 110. In some embodiments, the software components 302A-302N may be representative of a new application to be executed on one of the peripherals (e.g., a printer) of the gaming machine 110. In some embodiments, the software components 302A-302N may be representative of a patch to existing instructions that are executable on the gaming machine 110 or one or more peripherals of the gaming machine 110. The software components 302A-302N may also be representative of a new file or replacement of an existing filed (e.g., a new library file) on the gaming machine 110 or one or more peripherals of the gaming machine 110. The software component may be related to the video or audio of the gaming machine 110 (e.g., a new video plug-in). The software component may be related to the operating system (including patches thereto).

In some embodiments, the software components may have a limited time of use. For example, the software components may be advertising content for movies, events, etc. Accordingly, the data package 300 may also include a validity time period. Additionally, the data package 300 may contain of schedule of use for the advertising content. For example, the advertising content is to only be displayed on the gaming machine 110 on certain days, certain times of the day, etc.

In some embodiments, the software components may be the reel symbols to be displayed on the reels of the gaming machine 110. These reel symbols may or may not have a limited time of use, schedule, etc. In some embodiments, the software component may be a new configuration download. For example, the new configuration may modify the denominations on the gaming machine 110. To illustrate, the denomination may be increased from 7 pm-11 pm nightly and then decreased after such time.

In some embodiments, the software components 302A-302N may be representative of executable applications. Alternatively, the software components 302A-302N may be representative of source code that may be compiled on the gaming machine 110 prior to execution. Accordingly, the gaming machine 110 may include a compiler for compilation of such source code prior to execution.

The data package 300 may also include a list of dependencies 304. The list of dependencies 304 includes those components that the software components 302A-302N are dependent. Each of the software components 302 may have a separate list of dependencies. In some embodiments, one of the software components 302 may be dependent on one of the other software components 302. The list of dependencies 304 may include a particular version or range of versions of a given dependency from which the software component 302 depends. For example, a particular software component 302 may be dependent on a version 2.5 or greater, a version 2.0 or lesser, versions in the range of 2.5-3.5, etc. In some embodiments, the dependencies may be other software components, hardware components, etc. For example, the dependency may be that the memory is required to be of a given size or greater.

The data package 300 may also include a pre-installation script(s) 306 and a post-installation script(s) 308. The pre-installation script(s) 306 and the post-installation script(s) 308 may include one or more instructions that are to be executed prior to and subsequent to the installation of the software component 302, respectively. For example, instructions in the pre-installation script(s) 306 may verify or create particular directory structures or move file(s) to backup locations. Other instructions in the pre-installation script(s) 306 may log out or cash out a player of the gaming machine 110. Other instructions in the pre-installation script(s) 306 may cause the gaming machine 110 to move to an out-of-service state. Other instructions in the pre-installation script(s) 306 may initiate a logging to track the operations of the installation.

Instructions in the post-installation script(s) 308 may include instructions to retrieve licenses for the software component 302. For example, the instructions in the post-installation script(s) 308 may retrieve a license key from the master game server 202, which allows for execution of the application. Other instructions in the post-installation script(s) 308 may include instructions to delete a previous version of an application, move the application to a peripheral, notify the master game server 102 of successful completion, etc. Other instructions in the post-installation script(s) 308 may include instructions to update boot scripts, reboot the gaming machine 110, notify active applications of the installation, remove initiation of the previous version, etc.

FIG. 4 illustrates a data structure of installed software stored in the gaming machine, according to some embodiments of the invention. In particular, a table 400 includes a list of software that is installed and/or stored on the gaming machine 110. The table 400 may be representative of the table of software 210.

The table 400 includes a column 402 that includes an identification of the software. The table 400 also includes a column 404 that includes a version of the software and a column 406 that includes the installation/storage date of the software. As further described below, the table 400 may be used to verify that a given version or range of versions of a dependency for a given software component are on the gaming machine 110, prior to installation of the software component.

FIG. 5 illustrates a computer device that executes software for performing operations related to dependency verification, according to some embodiments of the invention. In particular, FIG. 5 illustrates a computer system 500 that may execute the modules shown in FIG. 2.

As illustrated in FIG. 5, the computer system 500 comprises processor(s) 502. The computer system 500 also includes a memory unit 530, processor bus 522, and Input/Output controller hub (ICH) 524. The processor(s) 502, memory unit 530, and ICH 524 are coupled to the processor bus 522. The processor(s) 502 may comprise any suitable processor architecture. The computer system 500 may comprise one, two, three, or more processors, any of which may execute a set of instructions in accordance with embodiments of the invention.

The memory unit 530 may store data and/or instructions, and may comprise any suitable memory, such as a dynamic random access memory (DRAM). The computer system 500 also includes IDE drive(s) 508 and/or other suitable storage devices. A graphics controller 504 controls the display of information on a display device 506, according to some embodiments of the invention.

The input/output controller hub (ICH) 524 provides an interface to I/O devices or peripheral components for the computer system 500. The ICH 524 may comprise any suitable interface controller to provide for any suitable communication link to the processor(s) 502, memory unit 530 and/or to any suitable device or component in communication with the ICH 524. For one embodiment of the invention, the ICH 524 provides suitable arbitration and buffering for each interface.

For some embodiments of the invention, the ICH 524 provides an interface to one or more suitable integrated drive electronics (IDE) drives 508, such as a hard disk drive (HDD) or compact disc read only memory (CD ROM) drive, or to suitable universal serial bus (USB) devices through one or more USB ports 510. For one embodiment, the ICH 524 also provides an interface to a keyboard 512, a mouse 514, a CD-ROM drive 518, one or more suitable devices through one or more firewire ports 516. For one embodiment of the invention, the ICH 524 also provides a network interface 520 though which the computer system 500 can communicate with other computers and/or devices.

In some embodiments, the computer system 500 may be employed as the master game server 102, the download manager 108, or the gaming machine 110. In some embodiments, the computer system 500 includes a machine-readable medium that stores a set of instructions (e.g., software) embodying any one, or all, of the methodologies for dependency verification for distributed gaming content described herein. Furthermore, software may reside, completely or at least partially, within memory unit 530 and/or within the processor(s) 502.

Figure 6:
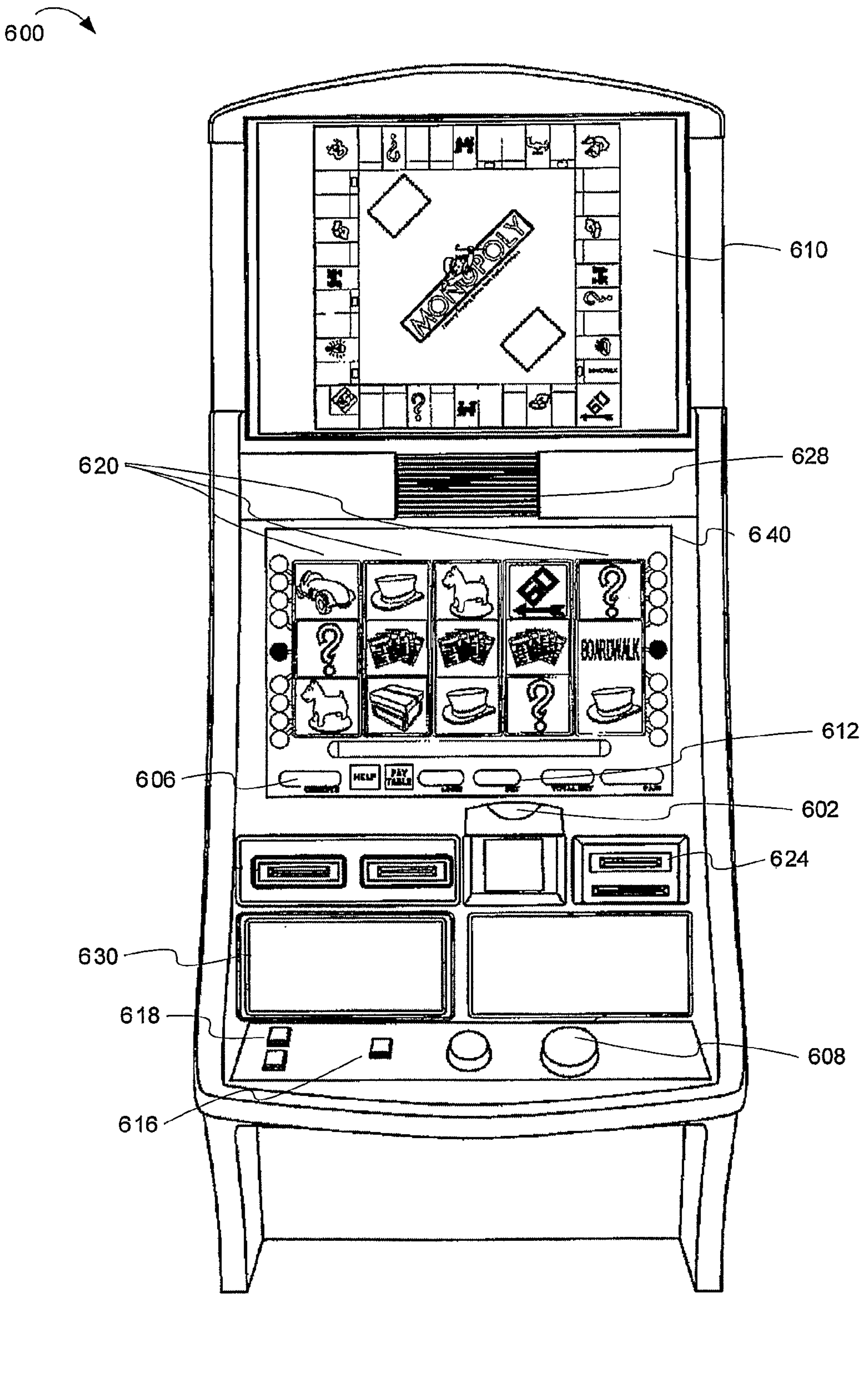
FIG. 6 is a perspective view of a gaming machine, according to some embodiments of the invention.

While FIG. 5 describes a computer system that may be used in conjunction with embodiments of the invention, FIG. 6 describes embodiments of a gaming machine that may be used with embodiments of the invention.

FIG. 6 is a perspective view of a gaming machine, according to exemplary embodiments of the invention. As shown in FIG. 6, the gaming machine 600 can be a computerized slot machine having the controls, displays, and features of a conventional slot machine.

The gaming machine 600 can be operated while players are standing or seated. Additionally, the gaming machine 600 is preferably mounted on a stand (not shown). However, it should be appreciated that the gaming machine 600 can be constructed as a pub-style tabletop game (not shown), which a player can operate while sitting. The gaming machine 600 may also be in the form of a handheld device. For example, the gaming machine 600 may be part of a Personal Digital Assistant (PDA), cellular telephone, etc. Furthermore, the gaming machine 600 can be constructed with varying cabinet and display designs. The gaming machine 600 can incorporate any primary game such as slots, poker, or keno, and additional bonus round games. The symbols and indicia used on and in the gaming machine 600 can take mechanical, electrical, or video form.

As illustrated in FIG. 6, the gaming machine 600 includes a coin slot 602 and bill acceptor 624. Players can place coins in the coin slot 602 and paper money or ticket vouchers in the bill acceptor 624. Other devices can be used for accepting payment. For example, credit/debit card readers/validators can be used for accepting payment. Additionally, the gaming machine 600 can perform electronic funds transfers and financial transfers to procure monies from financial accounts. When a player inserts money in the gaming machine 600, a number of credits corresponding to the amount deposited are shown in a credit display 606. After depositing the appropriate amount of money, a player can begin playing the game by pushing play button 608. The play button 608 can be any play activator used for starting a wagering game or sequence of events in the gaming machine 600.

As shown in FIG. 6, the gaming machine 600 also includes a bet display 612 and a "bet one" button 616. The player places a bet by pushing the bet one button 616. The player can increase the bet by one credit each time the player pushes the bet one button 616. When the player pushes the bet one button 616, the number of credits shown in the credit display 606 decreases by one credit, while the number of credits shown in the bet display 612 increases by one credit.

A player may "cash out" by pressing a cash out button 618. When a player cashes out, the gaming machine 600 dispenses a voucher or currency corresponding to the number of remaining credits. The gaming machine 600 may employ other payout mechanisms such as credit slips (which are redeemable by a cashier) or electronically recordable cards (which track player credits), or electronic funds transfer.

The gaming machine also includes a primary display unit 604 and a secondary display unit 610 (also known as a "top box"). The gaming machine may also include an auxiliary video display 640. In one embodiment, the primary display unit 604 displays a plurality of video reels 620. According to embodiments of the invention, the display units 604 and 610 can include any visual representation or exhibition, including moving physical objects (e.g., mechanical reels and wheels), dynamic lighting, and video images. In one embodiment, each reel 620 includes a plurality of symbols such as bells, hearts, fruits, numbers, letters, bars or other images, which correspond to a theme associated with the gaming machine 600. Furthermore, as shown in FIG. 6, the gaming machine 600 includes an audio presentation unit 628. The audio presentation unit 628 can include audio speakers or other suitable sound projection devices.

In one embodiment, a plurality of gaming machines can be connected to a plurality of download managers in a gaming network. In the gaming network, the gaming machines can receive data packages, as described herein. Additionally, the gaming machines can conduct casino style wagering games based on the gaming content.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

Figure 7:
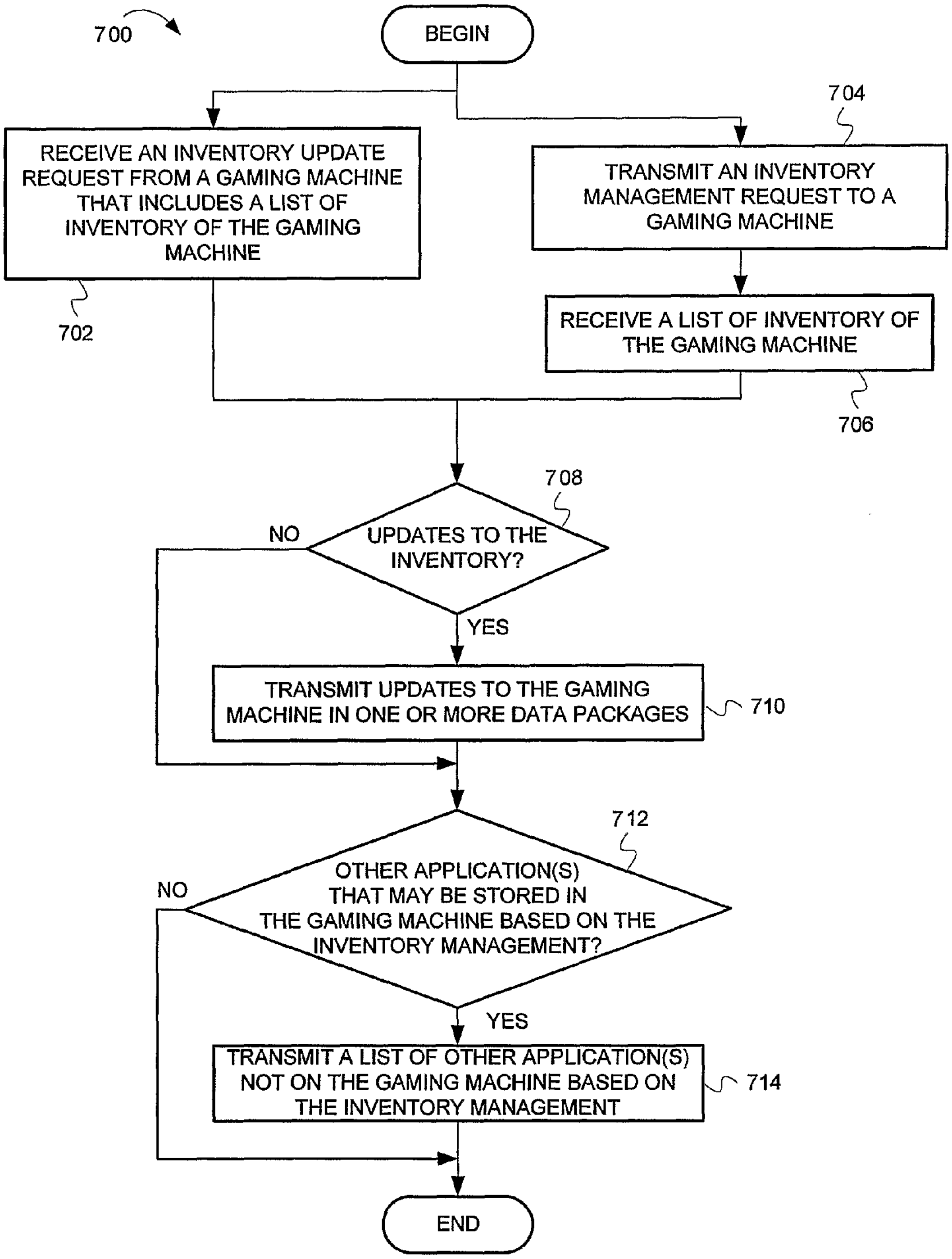
FIG. 7 illustrates a flow diagram for operations for distributing a data package that includes dependency verification, according to some embodiments of the invention.
Figure 8:
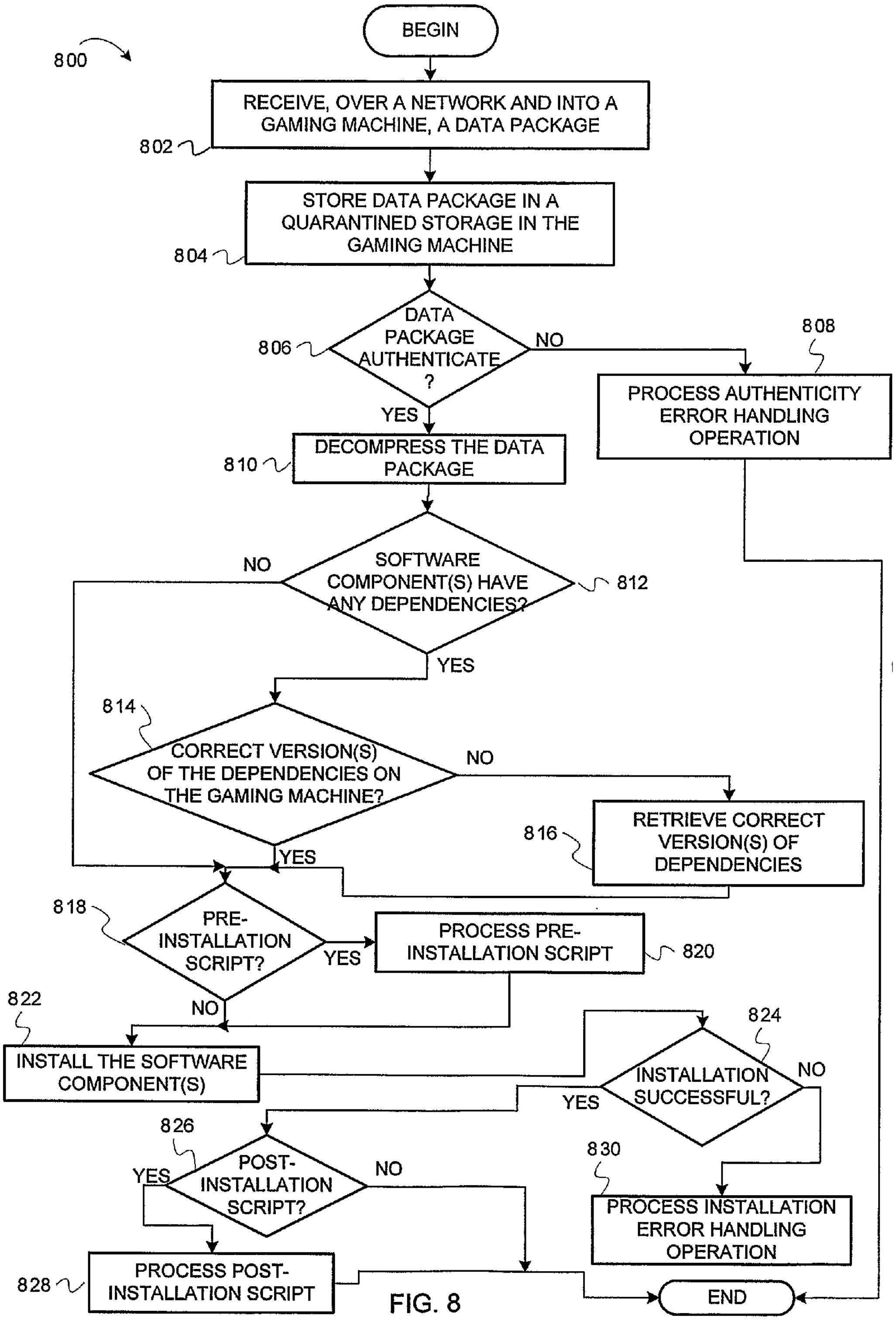
FIG. 8 illustrates a flow diagram for dependency verification for distributed gaming content, according to some embodiments of the invention.
Figure 9:
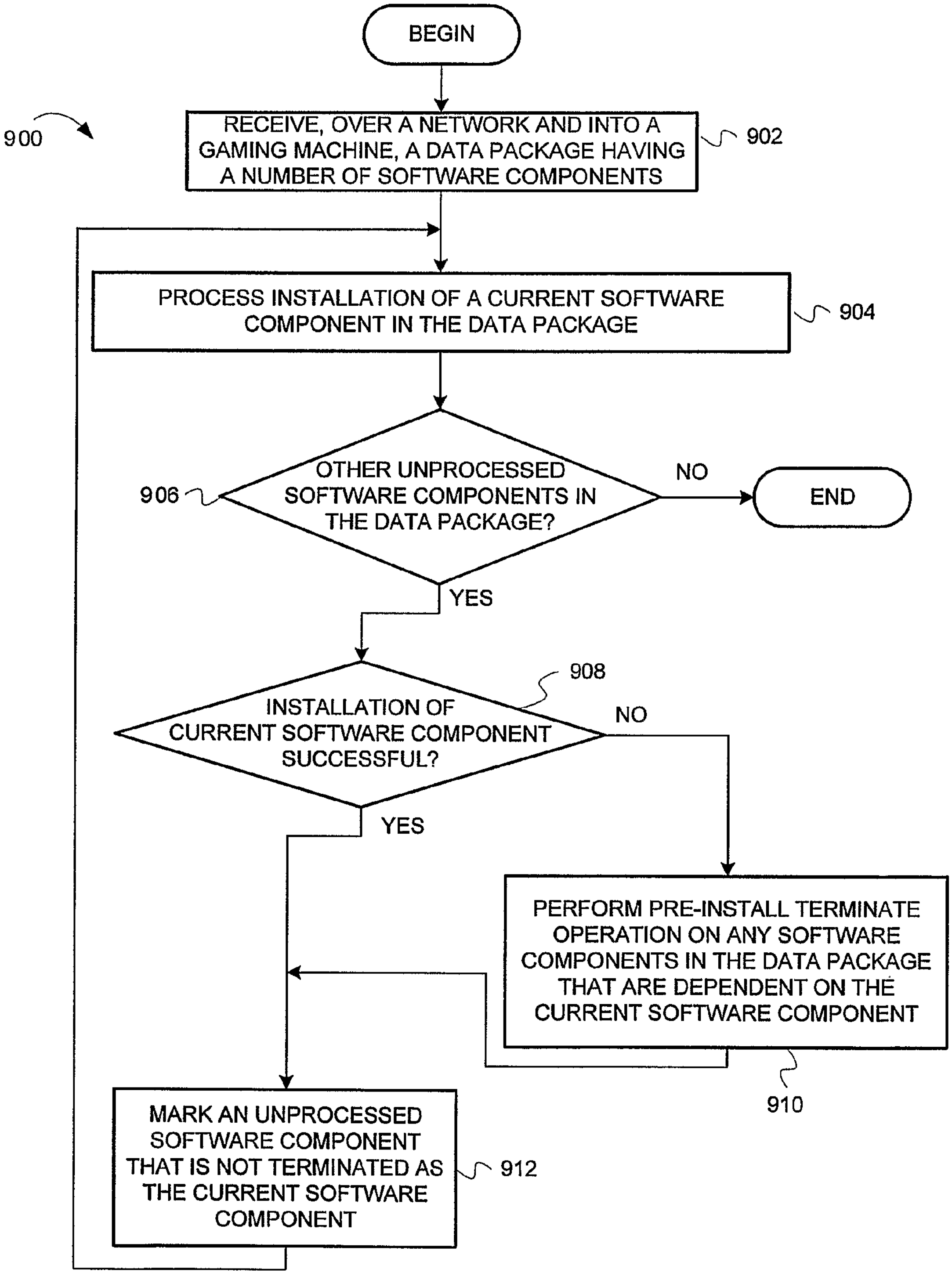
FIG. 9 illustrates a flow diagram for dependency verification for distributed gaming content for data packages having multiple software components, according to some embodiments of the invention.
Figure 10:
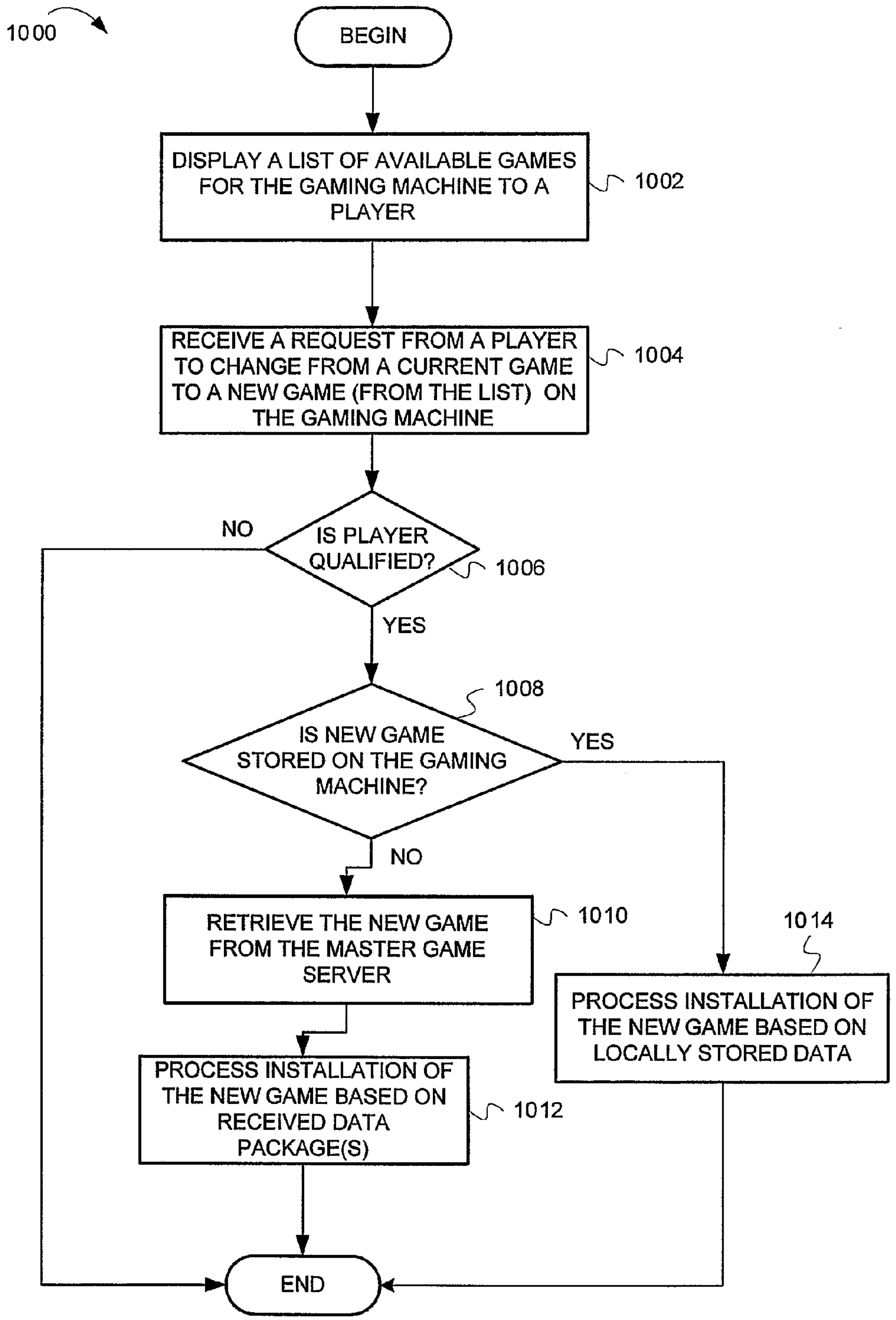
FIG. 10 illustrates a flow diagram for updating software components in a gaming machine based on player input, according to some embodiments of the invention.
Figure 11:
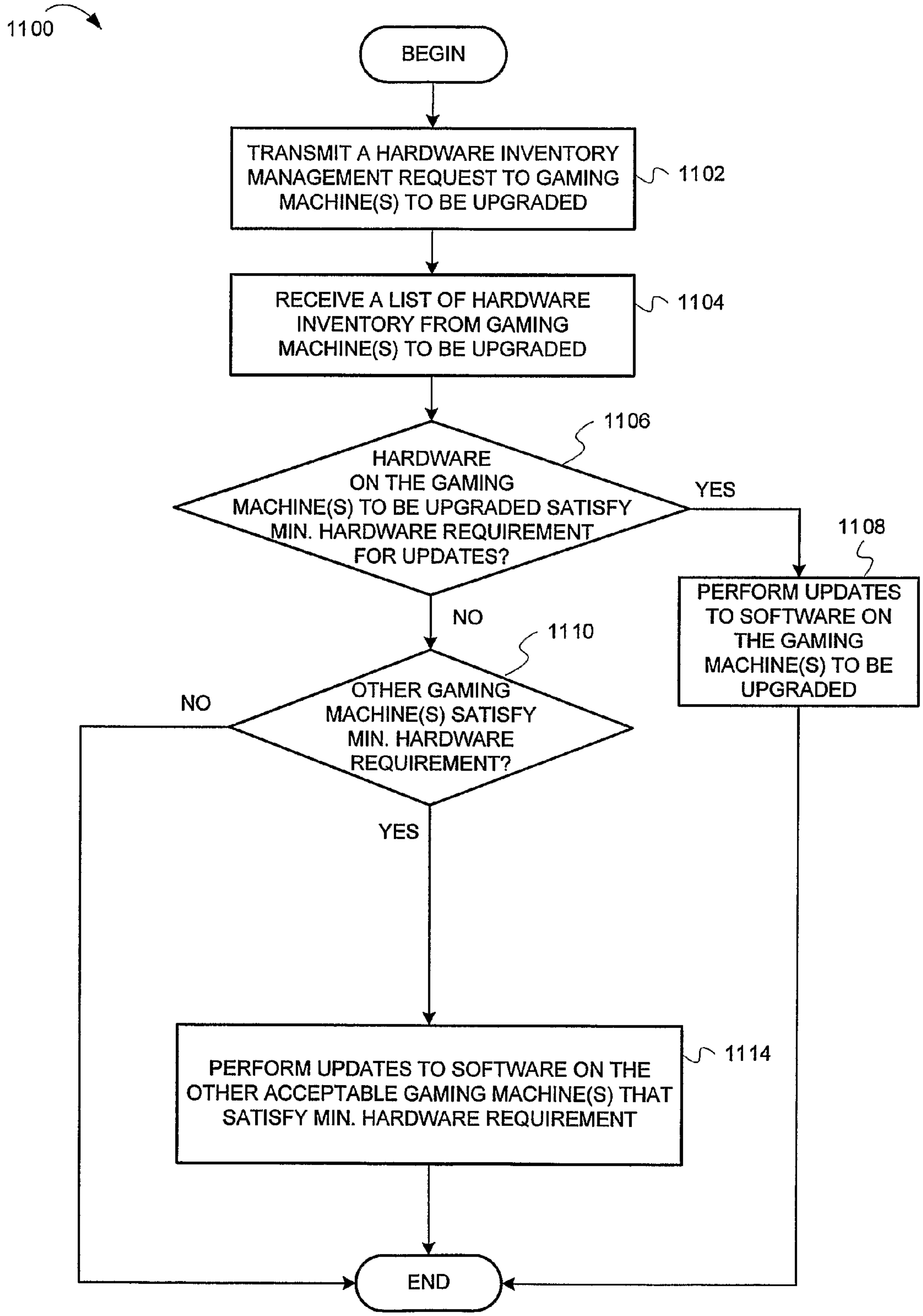
FIG. 11 illustrates a flow diagram for verification of hardware in the gaming machine prior to downloading of updates thereto, according to some embodiments of the invention.

In this section, FIGS. 7-10 are discussed. In particular, FIG. 7 describes operations for distributing a data package that includes dependency verification. FIG. 8-9 describes operations (that includes dependency verification) for processing distributed gaming content for a data package having one or more software components. FIG. 10 describes operations (that includes dependency verification) enabling a player of a gaming machine to update software components therein. FIG. 11 describes operations verification of hardware in the gaming machine prior to downloading of updates.

The system operations are described relative to downloads to a gaming machine. However, embodiments are not so limited. For example, the download may be from the master game server 102 to one of the download managers 108. In some embodiments, the download may be from a remote server (such as one that is off-site from a casino) to a content repository (such as the gaming and licensing content store 104). This description proceeds with a discussion of FIG. 7.

FIG. 7 illustrates a flow diagram for operations for distributing a data package that includes dependency verification, according to some embodiments of the invention. FIG. 7 illustrates operations that may be executed by the master game server 102. The operations provide for the processing of inventory updates for one or more gaming machines 110.

The flow diagram 700 will be described with reference to FIGS. 1-4. The flow diagram 700 illustrates two different techniques for initiating the operations therein. Accordingly, two paths are illustrated. A first path (block 702) may be initiated by one of the download managers 108 or one of the gaming machines 110. A second path (block 704 and block 706) may be initiated by the master game server 102 on which such operations are executed. The flow diagram 700 commences at block 702 or at block 704.

At block 702, an inventory update request is received from a gaming machine or a download manager. In some embodiments, the master game server 102 receives this inventory update request from one of the gaming machines 110 or one of the download manager 108. For example, periodically (e.g., daily, weeldy, monthly, etc.), this inventory update request is received to ensure that the gaming machine 110 and/or peripherals attached thereto have the latest updates of the software components therein. In some embodiments, the inventory update request may include a list of some or all software components on the gaming machine 110 and/or peripheral, a particular software component on the gaming machine 110 and/or peripheral, etc. The inventory update request may also include the current version of the software components, date of installation, etc. For example, in some embodiments, the list may include the entries in the table 400 (shown in FIG. 4). In some embodiments, the list of inventory may also include the type of hardware (type of processor, size of memory, the amount of available space on the hard drive for new applications, the types of peripherals, the physical type of the gaming machine, etc.). The list of inventory may also include the list of players that have played the gaming machine 110 for a particular time period (since the game has been put into operation, for the last month, etc.). The list of inventory may also include the number of times that a given game has been played on the gaming machine 110 for a particular time period (since the game has been put into operation, for the last month, etc.). The flow continues at block 708, which is described in more detail below.

At block 704, an inventory management request is transmitted to a gaming machine. In some embodiments, the master game server 102 transmits the inventory management request to one or more of the gaming machine 110. Similar to the operations at block 702, the inventory management request may be transmitted periodically to ensure that the gaming machines 110 have the latest updates of the software components therein. The inventory management request may include a request for information for all, some or one software component(s) on the gaming machine 110 or peripherals attached thereto. The master game server 102 may transmit the inventory management request for all gaming machines 110 coupled to the network 106, for all or part of the gaming machines 110 for a particular download manager 108, for all or part of the gaming machines 110 for a group of download managers 108, etc. The flow continues at block 706.

At block 706, a list of inventory of the gaming machine is received. In some embodiments, the master game server 102 receives this list back from the download managers 108 and/or the gaming machines 110. Similar to the operations at block 702, the list may include the entries in the table 400 (shown in FIG. 4). The flow continues at block 708.

At block 708, a determination is made of whether updates to the inventory are needed. In some embodiments, the master game server 102 makes this determination. The master game server 102 may compare the list of inventory received to its list of software components (including the latest versions). The master game server 102 may retrieve its list from the gaming and licensing content store 104. In some embodiments, the master game server 102 may determine that updates are needed for each software component in which there is a newer version. In some embodiments, the master game server 102 may determine whether an attribute of the hardware in the gaming machine satisfies the minimum hardware requirements in order to execute the updates. For example, a determination may be made if a particular game is to be updated that requires a minimum amount of memory, a minimum speed of the processor, a minimum amount of storage, etc. A more detailed description of operations for determining whether such minimum hardware requirements are satisfied, according to some embodiments, are set forth below (see description of FIG. 11). If there are updates to the inventory, the flow continues at block 710. Otherwise, the flow continues at block 712.

At block 710, updates are transmitted to the gaming machine in one or more data packages. In some embodiments, the master game server 102 transmits the software components in one or more data packages 300 (shown in FIG. 3). Therefore, the master game server 102 may include a list of dependencies for a particular software component, pre-installation scripts and post-installation scripts. As described above, in some embodiments, the master game server 102 received the list of all software components on the gaming machine 110 and the peripherals attached thereto. Accordingly, if a particular software component that is being updated needs a version of another software component (that is not on the gaming machine 1110), the master game server 102 may include this version of the dependent software component in one of the data packages. In some embodiments, the master game server 102 transmits the software components in an order based on dependencies. For example, if software component A is dependent on software component B (both of which needed to be updated), the master game server 102 includes the software component B in a same or earlier data package as software component A. The flow continues at block 712.

At block 712, a determination is made of whether other application(s) may be stored in the gaming machine based on the inventory management. In some embodiments, the master game server 102 may make this determination. For example, the master game server 102 may make the determination that additional games are to be added based any of a number of different criteria. The master game server 102 may determine that games X, Y and Z are to be added based on the amount of hard drive space available, the physical type of the gaming machine, the types of players that typically play the gaming machine 110. For example, if the most played game on the gaming machine 110 for a given time period is game B and if market research has determined that players of game B also play game F, the master game server 102 may determine to store game F onto the gaming machine 110. In some embodiments, the master game server 102 may determine whether the hardware in the gaming machine satisfies the minimum hardware requirements in order to execute the other application(s) (see description of block 704 above). If there are other applications to be stored on the gaming machine 110, the flow continues at block 714. Otherwise, the operations of the flow diagram 700 are complete.

At block 714, a list of the other application(s) that may be stored on the gaming machine are transmitted to the gaming machine 110. In some embodiments, the master game server 102 transmits this list to the gaming machine 110. As further described below, the gaming machine 110 may request a download of the new applications from the master game server 102. The download of the new applications may include dependency verification (as described in FIGS. 8-9 below). The operations of the flow diagram 700 are complete.

The operations of dependency verification are now described for gaming content (e.g., software components) downloaded into the gaming machine 110. In particular, FIG. 8 illustrates a flow diagram for operations for dependency verification for distributed gaming content, according to some embodiments of the invention. The flow diagram 800 will be described with reference to FIGS. 1-4. While the flow diagram 800 describes dependency verification relative to the gaming machine 110, such operations are applicable to dependency verification for peripherals of the gaming machine 110. The flow diagram 800 commences at block 802.

At block 802, a data package is received over a network and into a gaming machine. For example, the gaming machine 110 receives a data package from the master game server 100 over the network 106. In some embodiments, the gaming machine 110 may receive the data package based on an inventory update request or inventory management request (as described in the flow diagram 700 of FIG. 7). The gaming machine 110 may also receive the data package based on a request that is initiated by a player of the gaming machine 110. Examples of such operations are illustrated in FIG. 10, which is described in more detail below.

As described above, the data package may include one or more software components that are to be installed in the gaming machine 110 or a peripheral thereof. The data package may also include a list of versions of dependencies that the software components are dependent. The data package may also include a pre-installation script and a post-installation script. In some embodiments, the data package may be compressed. In addition, the data package may be encrypted. Examples of the types of encryption may include different types of asymmetric key and symmetric key encryption. The data package may be encrypted in accordance with different Data Encryption Standards (DES), the Rivest, Shaman and Adelman (RSA) algorithm, etc. The data package may also be digitally signed based on a digital signature, public/private key pair, etc. The flow continues at block 804.

At block 804, the data package is stored in a quarantined storage in the gaming machine. For example as shown in FIG. 2, the download module 202 may store the data package into the quarantined storage 212 of the storage device 208. The quarantined storage 212 may be a part of the storage device that may have limited accessibility (as described above). The flow continues at block 806.

At block 806, a determination is made of whether the data package is authentic. In some embodiments, the authentication module 204 may make this determination. The authentication module 204 may authenticate through a private/public key pair operation. The authentication module 204 may authenticate based on decryption of the data package with the public key of the master game server 102 (which encrypted the data package with its private key). Authentication may also be based on the use of a digital signature. The master game server 102 may digitally sign the data package. The authentication module 204 may then authenticate based on the digital signature appended to the data package.

In some embodiments, the data package may be authenticated based on certificates from multiple entities. For example, in some embodiments, the data package may include a first digital certificate that is from the master game server 102 that authenticates the point of origin of the data package. The data package may also include a second digital certificate that certifies that a regulatory body has approved the data package. In some embodiments, the data package may be received from a third party provider. For example, the third party provider may provide local advertising content, language translation, etc. Accordingly, the data package may include another digital certificate from the owner of the gaming machine 110 that certifies the data package provided by this provider. If the data package is not authentic, the flow continues at block 808. Otherwise, the flow continues at block 810.

At block 808, an authenticity error handling operation is processed. In some embodiments, the authentication module 204 may process the authenticity error handling operation. For example, the authentication module 204 may abort the download of the software component, update an error log that marks information related to the authenticity error, transmit an error message back to the master game server 102, shut down the gaming machine 110, reboot the gaming machine 110, transmit a message over the network 106 to the proper regulatory authority, etc. The operations of the flow diagram 800 are then complete.

At block 810, the data package is decompressed. In some embodiments, the authentication module 204 may decompress the data package. In some embodiments, the data package is first decompressed and then authenticated. This order of operation is dependent on the order of compression and encryption performed by the master game server 102. The flow continues at block 812.

At block 812, a determination is made of whether the software component(s) in the data package have any dependencies. In some embodiments, the version manager module 206 may make this determination. The version manager module 206 may make this determination based on list of dependencies for the software components that are part of the data package (see discussion of FIG. 3 above). The list of dependencies may include the correct version(s) of a given dependency. If the software component in the data package has dependencies, the flow continues at block 814. Otherwise, the flow continues at block 818.

At block 814, a determination is made of whether the correct version(s) of the dependencies are on the gaming machine. In some embodiments, the version manager module 206 may make this determination. The version manager module 206 may make this determination based on the table 400 (shown in FIG. 4) stored on the gaming machine 110. In some embodiments, if the software component is for storage on a peripheral, the table 400 may also store data of version(s) of dependencies for such peripherals. Alternatively, a similar data structure may be stored on the peripheral that may be retrieved by the version manager module 206. If the correction version(s) of the dependencies are not stored on the gaming machine 110, the flow continues at block 816. Otherwise, the flow continues at block 818.

At block 816, the correct version(s) of the dependencies are retrieved. In some embodiments, the download module 202 may retrieve the correct version(s). The download module 202 may request the correct version(s) from the master game server 102. In some embodiments, if the correction version(s) of the dependencies are not stored on the gaming machine 110, a different operation is executed. For example, an error handling operation may be executed wherein the operations of the flow diagram 800 are aborted (similar to the error handling operations described at block 808). Assuming that the retrieval operation is performed, the flow continues at block 818.

At block 818, a determination is made of whether the software component is associated with a pre-installation script (stored in the data package). In some embodiments, the install module 207 may make this determination. The install module 207 may make this determination based on whether a pre-installation script is stored in the data package. If there is a pre-installation script for the software component, the flow continues at block 820. Otherwise, the flow continues at block 822.

At block 820, the pre-installation script is processed. In some embodiments, the install module 207 may process the pre-installation script. Examples of the different types of instructions in the pre-installation script are described above in conjunction with the description of FIG. 3. The flow continues at block 822.

At block 822, the software component is installed. In some embodiments, the install module 207 installs the software component. If the software component is a single file, the install module 207 may replace or add this file in the correct location on the gaming machine 110 or peripherals thereof. If the software component is an entire application, the installation may include the typical operations associated therewith. If this is an installation of a newer version of an application, this may include the removal of the previous version, overwriting files of the previous version, etc. The installation may include creation of directories, files, updates registries, database files, etc. As part of the pre-installation or the installation, the install module 207 may also stop execution of the current version of the application.

As part of the pre-installation or the installation, the install module 207 may be required to remove other software components because of limited storage on the gaming machine 110. In some embodiments, the install module 207 may remove games based on a number of criteria (such as the game earning the least, length of time on the gaming machine, least time played, etc.).

In some embodiments, certain games may not be deleted for a given time. For example, regulations may include that a history of the last 50 plays are to be stored. In some embodiments, the games are required to be stored on the gaming machine 110 to maintain this history. Accordingly, a game may not be deleted until such game is no longer part of the last 50 plays on the gaming machine 110. If this game is required to be deleted in order to install the new software component, in some embodiments, the installation would fail. In some embodiments, an installation may fail if a game is required to be deleted in order to perform the installation.

The games installed on the gaming machine 110 may have expiration dates. Accordingly, the games are no longer playable after a given date. The expired games may be deleted in a background maintenance operation. The install module 207 may perform such operations periodically.

The installation may be interrupted by a loss of power. Accordingly, recordations in a log stored on the gaming machine 110 indicate that an installation is initiated and an installation is completed. If an installation is initiated and not completed, the installation may be restarted or completed after power is restored. In some embodiments, part of the power-up of the gaming machine 110 may include a check of such a log to verify that there are no uncompleted installations. The flow continues at block 824.

At block 824, a determination is made of whether the installation of the software component was successful. In some embodiments, the install module 207 may make this determination. The install module 207 may make this determination based on a number of criteria. The install module 207 may verify that all of the operations (e.g., creation of directory structures/files, updates to existing files (registries)) that are part of the installation were performed. The install module 207 may also verify based on one or more tests on the gaming machine 110 to verify that the software component is executing properly. If the installation was successful, the flow continues at block 826. Otherwise, the flow continues at block 830.

At block 826, a determination is made of whether the software component is associated with a post-installation script (stored in the data package). In some embodiments, the install module 207 may make this determination. The install module 207 may make this determination based on whether a post-installation script is stored in the data package. If there is a post-installation script for the software component, the flow continues at block 828. Otherwise, the operations of the flow diagram 800 are complete.

At block 828, the post-installation script is processed. In some embodiments, the install module 207 may process the post-installation script. Examples of the different types of instructions in the post-installation script are described above in conjunction with the description of FIG. 3. The operations of the flow diagram 800 are complete.

At block 830, an installation error handling operation is processed. In some embodiments, the install module 207 may process the install error handling operation. For example, the install module 207 may revert back to the previous version. The install module 207 may undo the operations performed based on the pre-installation script. For example, the install module 207 may delete directory structures/files that were created/modified, etc. The install module 207 may update an error log, transmit an error message back to the master game server 102, shut down the gaming machine 110, reboot the gaming machine 110, transmit a message over the network 106 to the proper regulatory authority, etc. The operations of the flow diagram 800 are then complete.

In some embodiments, more than one software component may be store in the data package received from the master game server 102. If the data package includes more than one software component, operations may be executed to account for situations wherein one software component in the data package is dependent on a different software package in the same data package. The operations of dependency verification for multiple software components in a same data package are now described. In particular, FIG. 9 illustrates a flow diagram for dependency verification for distributed gaming content for data packages having multiple software components, according to some embodiments of the invention. The flow diagram 900 will be described with reference to FIGS. 1-4. The flow diagram 900 describes dependency verification relative to the gaming machine 110, such operations are applicable to dependency verification for peripherals of the gaming machine 110. The flow diagram 900 commences at block 902.

At block 902, a data package is received over a network and into a gaming machine. For example, the gaming machine 110 receives a data package from the master game server 100 over the network 106. In some embodiments, the gaming machine 110 may receive the data package based on an inventory update request or inventory management request (as described in the flow diagram 700 of FIG. 7). The gaming machine 110 may also receive the data package based on a request that is initiated by a player of the gaming machine 110. Examples of such operations are illustrated in FIG. 10, which is described in more detail below.

For the operations of the flow diagram 900, the data package includes more than one software component. A software component in the data package may or may not dependent on another software component therein. The data package may include a list of dependences, a pre-installation script and a post-installation script for each of the software components therein. As described in the flow diagram 800 of FIG. 8, the data package may be compressed, encrypted and/or digitally signed. The flow continues at block 904.

At block 904, the installation of a current software component in the data package is processed. In some embodiments, the download module 202, the authentication module 204, the version manager module 206 and the install module 207 process this installation. The process of performing the installation is described above in conjunction with the flow diagram 800 of FIG. 8. In particular, the installation may include the operations at blocks 804-826 of FIG. 8. In some embodiments, the order of installation may be stored in a log that is part of the data package. The order of installation may be based on the dependencies of the software component stored therein. For example, if software component A is dependent on software component B, the software component B is installed first. The flow continues at block 906.

At block 906, a determination is made of whether other unprocessed software components are in the data package. In some embodiments, the install module 207 may make this determination. As further described below, this determination is checked after the processing the installation of a current software component. If there are other unprocessed software components in the data package, the flow continues at block 908. Otherwise, the operations of the flow diagram 900 are complete.

At block 908, a determination is made of whether the installation of the current software component was successful. In some embodiments, the install module 207 may make this determination. The install module 207 may make this determination based on a number of criteria. The install module 207 may verify that all of the operations (e.g., creation of directory structures/files, updates to existing files (registries)) that are part of the installation were performed. The install module 207 may also verify based on one or more tests on the gaming machine 110 to verify that the software component is executing properly. If the installation of the current software product was not successful, the flow continues at block 910. Otherwise, the flow continues at block 912.

At block 910, a pre-install terminate operation is performed on any software components in the data package that are dependent on the current software component. In some embodiments, the install module 207 may perform this operation. As part of the operation, the install module 207 marks any of these software components in the data package as components that are not to be installed. The install module 207 may also update a log that is stored on the gaming machine 110 to indicate the termination. The install module 207 may also transmit an error message back to the master game server 102. The flow continues at block 912.

At block 912, an unprocessed software component that is not terminated is marked as the current software component. In some embodiments, the install module 207 may perform this operation. In some embodiments, the current software component may be moved to its official location. The install module 207 may mark the next software component in the order of installation (as described above) as the current software component. The flow continues at block 904, where the current software component is processed. Accordingly, as described, software components that depend on a software component that did not install properly are not installed.

In some embodiments, software components may be installed onto a gaming machine 110 based on player input. FIG. 10 illustrates a flow diagram for installing software components in a gaming machine based on player input, according to some embodiments of the invention. The flow diagram 1000 will be described with reference to FIGS. 1-4. The flow diagram 1000 commences at block 1002.

At block 1002, a list of available games for the gaming machine is displayed to the player. In some embodiments, the install module 207 causes the list to be displayed on a display of the gaming machine 110. In some embodiments, the order of the list may be based on the person playing the game (via a tracking card). For example, if a player typically plays games A, B and C and is currently playing game C, the top of the list includes games A and B. Also, the order of the list may be such that similar games to the current game being played are displayed first. The order of the list may be such that games that have not been played for the longest period of time are displayed first. In some embodiments, the games listed may or may not be stored on the gaming machine 110. For example, the list may include all games that may be played on a given gaming machine based on its configuration (independent of whether the game is stored on the gaming machine 110). The flow continues at block 1002.

At block 1004, a request is received from a player to change from a current game to a new game (from the list) on the gaming machine. In some embodiments, the install module 207 may receive this request. For example, the player may select a different game from the list based on any of a number of different types of user inputs (e.g., buttons). The flow continues at block 1006.

At block 1006, a determination is made of whether the player is qualified to change the game. In some embodiments, the install module 207 may make this determination. The player qualification may be based on one or more criteria. In some embodiments, the player qualification is based on whether a given number of gaming credits (one, 10, 100, etc.) are on the gaming machine 110. In some embodiments, a player is qualified based on their status on their tracking card that is inserted into the gaming machine 110. For example, only "gold club" players are qualified. In some embodiments, a player is charged for changing the game. For example, one or more gaming credits are charged for the change. In some embodiments, a player is charged if the game is required to be downloaded into the gaming machine 110. In some embodiments, any player may be allowed to change the game, but is charged for a change. Alternatively, certain players are not charged based on their status on their tracking card. If the player is qualified, the flow continues at block 1008. Otherwise, the operations of the flow diagram 1000 are complete.

At block 1008, a determination is made of whether the new game is stored on the gaming machine. In some embodiments, the version manager module 206 may make this determination. The version manager module 206 may make this determination based on the table 400 (shown in FIG. 4) that is stored in the gaming machine 110. If the new game is not stored on the gaming machine, the flow continues at block 1010. Otherwise, the flow continues at block 1012.

At block 1010, the new game is retrieved from the master game server. In some embodiments, the download module 202 may retrieve the new game from the master game server 102. The master game server 102 may transmit the new game in one or more data packages (as described in the flow diagram 800 of FIG. 8). The flow continues at block 1012.

At block 1012, installation of the new game is processed. In some embodiments, the download module 202, the authentication module 204, the version manager module 206 and the install module 207 process this installation. The process of performing the installation is described above in conjunction with the flow diagram 800 of FIG. 8. The operations of the flow diagram 1000 are complete.

At block 1014, installation of the new game is processed based on the locally stored data. The install module 207 may process this installation. The version manager module 206 may or may not perform dependency verification as part of the installation of the new game. For example, it may be assumed that because the new game is already locally stored that the dependencies of such game have been verified. Alternatively, the version manager module 206 may determine dependencies of the new game based on locally stored data in the gaming machine 110 and/or data retrieved from the master game server 102. Accordingly, the version manager module 206 may cause the retrieval of dependencies from the master game server 102 if such dependencies are not on the gaming machine 110. The master game server 102 may transmit these dependencies in one or more data packages (as described in the flow diagram 800 of FIG. 8).

In some embodiments, the processing of the installation (at block 1012 and/or block 1014) may be terminated based on certain player activity. For example, if the player cashes out, the installation is terminated. Alternatively, if the player cashes out and does not return to play after a given time period (e.g., one minute, five minutes, etc.), the installation is terminated. Accordingly, the version manager module 206 may reinstall the previous game (as part of this termination).

In some embodiments, the hardware in the gaming machine is verified to determine whether an attribute of such hardware satisfies the minimum hardware requirements in order to execute the updates downloaded from the master game server 102. FIG. 11 illustrates a flow diagram for verification of hardware in the gaming machine prior to downloading of updates thereto, according to some embodiments of the invention. The flow diagram 1100 will be described with reference to FIGS. 1-4. The flow diagram 1100 commences at block 1102.

At block 1102, a hardware inventory management request is transmitted to the gaming machine(s) that are to be upgraded with software. In some embodiments, the master game server 102 transmits the hardware inventory management request to one or more of the gaming machines 110. With reference to FIG. 7, the hardware inventory management request may be part of the request transmitted at block 702. For example, the hardware inventory management request could include the type of gaming machine, the peripherals on the gaming machines 110, the amount of memory, the speed of the processor, the size of the storage device (including available space), etc. The master game server 102 may transmit this request to only those gaming machines 110 that are designated to have upgrades to software therein. For example, certain gaming machines 110 may be designated to receive a new game, a new operating system, etc. In some embodiments, the master game server 102 may transmit this request to all gaming machines 110 coupled to the network 106, to all or part of the gaming machines 110 for a particular download manager 108, for all or part of the gaming machines 110 for a group of download managers 108, etc. The flow continues at block 1104.

At block 1104, a list of the hardware inventory of the gaming machine(s) is received. In some embodiments, the master game server 102 receives this list back from the download managers 108 and/or the gaming machines 110. The flow continues at block 1106.

At block 1106, a determination is made of whether an attribute of the hardware on the gaming machine(s) to be upgraded satisfy the minimum hardware requirement for the updates. In some embodiments, the master game server 102 may make this determination. In particular, the updates to be downloaded may include requirements stored as part of the update. For example, the update (such as a new game, new operating system) may require a minimum amount of memory, a particular type of peripheral for the gaming machine, a certain type of gaming machine, etc. Accordingly, the master game server 102 may compare the hardware inventory received back from the request to the minimum hardware requirements for the update. If the hardware on the gaming machine(s) satisfies the minimum hardware requirement, the flow continues at block 1108. Otherwise, the flow continues at block 1110 (which is described in more detail below).

At block 1108, updates to the software on the gaming machine(s) to be upgraded are performed. In some embodiments, the master game server 102 may perform this update. In some embodiments, the master game server 102 may perform the update using one or more data packages 300 (shown in FIG. 3). For further description, see the description of the operations at block 710 of FIG. 7). The operations of the flow diagram 1100 are then complete.

At block 1110, a determination is made of whether other gaming machines satisfy the minimum hardware requirements for the update. In some embodiments, the master game server 102 may make this determination. The attributes of the hardware may be available to the master game server 102 from the current and/or previous inventory requests. For example, the master game server 102 may have the attributes of all of the gaming machines at a given site. If other gaming machines do not include hardware that satisfy the minimum hardware requirement, the operations of the flow diagram 1100 are then complete. Otherwise, the flow continues at block 1114.

At block 1114, updates to the software on the other acceptable gaming machine(s) that satisfy the minimum hardware requirement are performed. In some embodiments, the master game server 102 may perform this update. The determination of which other gaming machines are acceptable may be made by the master game server 102 and/or operator thereof. In particular, the master game server 102 may have the option of which of the other gaming machines to update. This option may be automated and/or presented to an operator to make the determination. The determination may be based on a number of factors. For example, the locations of the other gaming machine(s) in the operating environment (e.g., a casino), the locations of the other gaming machine(s) relative to other gaming machines in the operating environment, the current games being executed on the other gaming machines, etc. may be factors in the determination. Accordingly, none or less than all of the gaming machines to be upgraded may receive the updates. In some embodiments, the master game server 102 may perform the update using one or more data packages 300 (shown in FIG. 3). For further description, see the description of the operations at block 710 of FIG. 7). The operations of the flow diagram 1100 are then complete.

In some embodiments for the flow diagram 1100, after a determination is made that one or more gaming machines do not satisfy the hardware requirement, an operator may update the hardware to satisfy the requirement. Subsequently, the updates can then be made to these gaming machines.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A machine-readable, non-transitory medium including instructions which when executed by a gaming system causes the gaming system to perform operations comprising:

- receiving, over a communications network, a data package that includes at least an exemplary version of a gaming software component, wherein the exemplary version depends on at least one different version of the gaming software component that is currently or previously installed on a gaming machine;
- verifying that the gaming machine includes the at least one different version of the gaming software component;
- prior to installing the exemplary version, removing or overwriting one or more previously installed gaming software components, the one or more previously installed gaming software components being selected for removal or overwriting based on predetermined criteria including at least one of game earnings, game playing time, and time since installation; and
- in response to at least the verifying, installing the exemplary version of the gaming software component on the gaming machine.

2. A machine readable, non-transitory medium including instructions which, when executed by a gaming system, cause the gaming system to perform operations comprising:

- receiving, over a communications network a data package that includes at least an exemplary version of a gaming software component, wherein the exemplary version depends on at least one different version of the gaming software component that is currently or previously installed on a gaming machine;
- verifying that the gaming machine includes the at least one different version of the gaming software component;
- prior to installing the exemplary version, selecting one or more previously installed gaming software components for removal or overwriting, the one or more previously gaming software components being selected for removal or overwriting based on predetermined criteria;
- in response to the one or more previously installed gaming software components not being removable or overwritable due to regulatory considerations, causing the installation to fail; and
- in response to at least the verifying as well as the removing or overwriting, installing the exemplary version of the gaming software component on the gaming machine.

3. The machine-readable medium of claim 1, further comprising retrieving, over the network and prior to the verifying, the at least one different version of the gaming software component if the gaming machine does not include the at least one different version.

4. The machine-readable medium of claim 1, wherein the data package further includes one of a new video plug-in and a new audio plug-in required for the exemplary version of the gaming software component.

5. The machine-readable medium of claim 1, further comprising storing the data package that includes the exemplary version in a quarantined storage area of the gaming machine, and authenticating the exemplary version prior to the installing.

6. A computer-implemented method of distributing gaming content to at least one gaming machine in a gaming system, the method comprising:

- receiving, via at least one input device, a request from a player at the at least one gaming machine to change a currently installed game to a new game;
- determining, via one or more processors, that the player is qualified and that the new game is not stored in the at least one gaming machine;
- transmitting a request for the new game to a master game server;
- receiving, from the master game server and into the at least one gaming machine, a data package that includes updated gaming content, a list of one or more software components which the updated gaming content requires for implementation on the at least one gaming machine, and one or more pre-installation instructions for configuring the at least one gaming machine to implement the updated gaming content, wherein the updated gaming content includes the new game;
- verifying, via one or more processors, that the at least one gaming machine includes the one or more required software components;
- in response to the verifying, configuring the at least one gaming machine by executing the one or more pre-installation instructions; and
- in response to completion of the pre-installation instructions, installing the updated gaming content on the at least one gaming machine.

7. The method of claim 6, wherein the player is qualified based on a number of game credits on the at least one gaming machine at the time of the request from the player or based on a status assigned to the player.

8. A computer implemented method of distributing gaming content to at least one gaming machine in a gaming system, the method comprising:

receiving, from a master game server and into the at least one gaming machine, a data package that includes updated gaming content, a list of one or more software components which the updated gaming content requires for implementation on the at least one gaming machine, one or more pre-installation instructions for configuring the at least one gaming machine to implement the updated gaming content, and one or more post-installation instructions to be executed subsequent to installation of the updated gaming content, wherein the one or more post-installation instructions includes retrieving a license for the updated gaming content;

verifying, via one or more processors, that the at least one gaming machine includes the one or more required software components;

in response to the verifying, configuring the at least one gaming machine by executing the one or more pre-installation instructions; and in response to completion of the pre installation instructions, installing the updated gaming content on the at least one gaming machine.

9. A computer-implemented method of distributing gaming content to at least one gaming machine in a gaming system, the method comprising:

receiving, from a master game server and into the at least one gaming machine, a data package that includes updated gaming content, a list of one or more software components which the updated gaming content requires for implementation on the at least one gaming machine, a first and second additional software components, and one or more pre-installation instructions for configuring the at least one gaming machine to implement the updated gaming content;

verifying via one or more processors, that the at least one gaming machine includes the one or more required software components;

in response to the verifying, configuring the at least one gaming machine by executing the one or more pre-installation instructions;

performing a pre-install termination operation of the first additional software component in response to the second additional software component failing to install successfully and the first additional software component being dependent on the second additional software component; and in response to the completion of the pre-installation instructions, installing the updated gaming content on the at least one gaming machine.

10. The method of claim 9, wherein the second additional software component is not successfully installed due to regulatory considerations.

11. A computer-implemented method of updating a game inventory of a gaming machine, the method comprising:

transmitting, via a gaming network, a game inventory request to at least one gaming machine over a network;

in response to the game inventory request, receiving a list of gaming content updates currently available for the at least one gaming machine;

verifying, via one or more processors, that the at least one gaming machine includes one or more software components required by at least one available gaming content update;

in response to the verifying, transmitting the at least one available gaming content update to the at least one gaming machine; and in response to the at least one gaming machine not including the one or more required software components, transmitting the at least one available gaming content update to a different gaming machine on the network, wherein the different gaming machine includes the one or more required software components.

12. The method of claim 11, wherein the at least one available gaming content update is a new game and wherein the transmitting of the game inventory request is initiated by a request from a player to change from a current game to the new game.

13. A computer-implemented method of updating a game inventory of a gaming machine, the method comprising:

transmitting, via a gaming network, a game inventory request to the gaming machine over a network;

in response to the game inventory request, receiving a list of gaming content updates currently available for the gaming machine;

verifying, via one or more processors, that the gaming machine includes one or more software components required by at least one available gaming content update;

in response to the verifying, transmitting the at least one available gaming content update to the gaming machine; and installing the at least one available gaming content update on the gaming machine, wherein the installing includes removing or overwriting one or more previously installed gaming software components, the one or more previously installed gaming software components being selected for removal or overwriting based on historical game play data from the gaming machine.

14. A gaming system for managing gaming content in one or more gaming machines, the system comprising:

a gaming machine configured to conduct wagering games, the gaming machine having at least one display device;

one or more processors; and at least one memory device storing instructions that, when executed by the one or more processors, cause the one or more processors to operate with the game machine to:

display a list of games, including a current game, that can be implemented on the gaming machine;

receive a selection from a player of a game from the list, the selected game being different from the current game;

determine if the player is qualified to play the selected game;

verifying that the gaming machine includes one or more software components required by the selected game; and in response to at least the verifying, installing the selected game on the gaming machine and presenting the selected game for play by the player.

15. The gaming system of claim 14, further comprising a master game server communicating with the gaming machine over a gaming network, wherein at least some of the game on the list of games are stored on the master game server, the master game server downloading at least the selected game for installation on the gaming machine in response to the verifying.

16. The gaming system of claim 15, wherein the master game server downloads additional games in response to the verifying, the additional games being selected based at least one of the selected game, software characteristics of the gaming machine, and hardware characteristics of the gaming machine.

17. The gaming system of claim 16, further comprising verifying that the gaming machine includes one or more additional software components required by the additional games.

18. The gaming system of claim 14, wherein the player is qualified based on a number of game credits on the gaming machine at the time of the selection or based on a status assigned to the player.

* * * * *

UNITED STATES PATENT AND TRADEMARK OFFICE

CERTIFICATE OF CORRECTION

PATENT NO. : 8,287,381 B2
APPLICATION NO. : 11/995764
DATED : October 16, 2012
INVENTOR(S) : Gagner et al.

It is certified that error appears in the above-identified patent and that said Letters Patent is hereby corrected as shown below:

In the Specifications:

In column 1, line 23, after “Gaming”, delete “,”, therefor

In column 2, line 22, delete “Figures”, and insert --figures--, therefor

In column 3, line 37, delete “202”, and insert --102--, therefor

In column 3, line 54, after “Ethernet”, delete “,”, therefor

In column 3, line 56, delete “120”, and insert --106--, therefor

In column 4, line 11, after “106”, insert --may be wireless--, therefor

In column 5, line 9, delete “802.11(1b)” and insert --802.11(b)--, therefor

In column 6, line 17, after “SIG”, delete “,”, therefor

In column 6, line 51, delete “202”, and insert --102--, therefor

In column 8, line 29, delete “202”, and insert --102--, therefor

In column 10, line 60, delete “FIG.” and insert --FIGS.--, therefor

In column 11, line 30, delete “weeldy” and insert --weekly--, therefor

In column 13, line 43, after “dependent”, insert --on--, therefor

In column 17, line 9, after “not”, insert --be--, therefor

Signed and Sealed this
Twenty-third Day of April, 2013

Teresa Stanek Rea
*Acting Director of the United States Patent and Trademark Office*

In column 17, line 34, before “processing”, delete “the”, therefor

In column 20, line 29, delete “FIG. 7).” and insert --FIG. 7.--, therefor

In column 20, line 57, after “etc.”, insert --,--, therefor

In column 20, line 63, delete “FIG. 7).” and insert --FIG. 7.--, therefor

In the Claims:

In column 21, line 45, in Claim 1, delete “which when” and insert --which, when--, therefor In column 21, line 45, in Claim 1, delete “system causes” and insert --system, cause--, therefor In column 21, line 65, in Claim 2, delete “machine readable” and insert --machine-readable--, therefor In column 22, line 1, in Claim 2, delete “network” and insert --network,--, therefor In column 22, line 11, in Claim 2, delete “previously” and insert --previously installed--, therefor In column 23, line 1, in Claim 8, delete “computer implemented” and insert --computer-implemented--, therefor In column 23, line 23, in Claim 8, delete “pre installation” and insert --pre-installation--, therefor In column 23, line 39, in Claim 9, delete “verifying” and insert --verifying,--, therefor In column 24, line 44, in Claim 14, delete “game” and insert --gaming--, therefor In column 24, line 60, in Claim 15, delete “game” and insert --games--, therefor